(12) United States Patent
Du

(10) Patent No.: US 7,965,709 B2
(45) Date of Patent: Jun. 21, 2011

(54) BRIDGE FORWARDING METHOD AND APPARATUS

(75) Inventor: Wenhua Du, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 476 days.

(21) Appl. No.: 11/583,760

(22) Filed: Oct. 18, 2006

(65) Prior Publication Data

US 2007/0097968 A1 May 3, 2007

(30) Foreign Application Priority Data

Oct. 19, 2005 (CN) .......................... 2005 1 0112882

(51) Int. Cl.
*H04L 12/56* (2006.01)
(52) U.S. Cl. ................... 370/389; 370/392; 370/395.53; 370/429; 709/243
(58) Field of Classification Search .................. 370/392, 370/395.53, 389, 390, 401, 356, 429; 707/3, 707/217, 218; 395/200.15, 200.02
See application file for complete search history.

(56) References Cited

U.S. PATENT DOCUMENTS

| | | | | |
|---|---|---|---|---|
| 5,511,168 A * | 4/1996 | Perlman et al. | ............... | 709/243 |
| 6,266,705 B1 | 7/2001 | Ullum et al. | | |
| 7,088,714 B2 * | 8/2006 | Athreya et al. | ............... | 370/389 |
| 7,260,565 B2 * | 8/2007 | Lee et al. | .............................. | 1/1 |
| 7,443,856 B2 * | 10/2008 | Lodha et al. | .................. | 370/392 |
| 7,558,273 B1 * | 7/2009 | Grosser et al. | ........... | 370/395.53 |
| 2002/0085551 A1 | 7/2002 | Tzeng | | |
| 2003/0053450 A1 | 3/2003 | Kubota et al. | | |
| 2003/0152075 A1 * | 8/2003 | Hawthorne et al. | ........... | 370/389 |
| 2005/0094634 A1 | 5/2005 | Santhanakrishnan et al. | | |
| 2005/0141537 A1 * | 6/2005 | Kumar et al. | .................. | 370/429 |
| 2006/0023724 A1 * | 2/2006 | Na et al. | .................... | 370/395.53 |
| 2006/0245436 A1 * | 11/2006 | Sajassi | ..................... | 370/395.53 |

FOREIGN PATENT DOCUMENTS

| | | |
|---|---|---|
| CN | 1356806 A | 7/2002 |
| CN | 1458771 | 11/2003 |
| CN | 1458771 A | 11/2003 |

(Continued)

OTHER PUBLICATIONS

Extended Search Report issued in corresponding European Patent Application No. 06 25 5388; issued Feb. 6, 2007.

(Continued)

*Primary Examiner* — Robert W Wilson
*Assistant Examiner* — Mohamed Kamara
(74) *Attorney, Agent, or Firm* — Brinks Hofer Gilson & Lione

(57) ABSTRACT

A bridge forwarding method comprises: receiving a frame from an input port, obtaining the input VLAN ID and a destination MAC address of the frame; determining an output port and an output VLAN ID of the frame, and forwarding the frame according to the output port and the output VLAN ID. A bridge forwarding apparatus includes at least one output port used for receiving a frame from more than one VALN, at least one output port used for transmitting the frame to more than one VALN and a forwarding unit, the forwarding unit obtains the input VLAN ID and the destination MAC address in the frame, determines the output port and the output VLAN ID of the frame, and outputs the frame to the corresponding output port. The method and the apparatus of this invention can realize the bridge forwarding of the Ethernet frames between multiple VLANs.

23 Claims, 4 Drawing Sheets

FOREIGN PATENT DOCUMENTS

| | | |
|---|---|---|
| CN | 1194508 | 3/2005 |
| CN | 100442772 C | 12/2008 |
| EP | 0 155 113 A2 | 9/1985 |
| EP | 1 206 077 A2 | 5/2002 |
| JP | 2004-72160 | 3/2004 |

OTHER PUBLICATIONS

Office Action issued in corresponding Chinese Patent Application No. 2005101128821; issued Nov. 30, 2007.

Office Action issued in corresponding Chinese Patent Application No. 200680012308.1; issued Jul. 14, 2010.

Office Action issued in corresponding European Patent Application No. 06 255 388.8; issued Sep. 8, 2010.

Written Opinion of the International Searching Authority issued in corresponding PCT Application No. PCT/CN2006/002462; mailed Feb. 1, 2007.

* cited by examiner

BRIDGE FORWARDING METHOD AND APPARATUS

FIELD OF THE TECHNOLOGY

The present invention relates to the network switching technical field. More particularly, the present invention relates to a bridge forwarding method and a bridge forwarding apparatus.

BACKGROUND OF THE INVENTION

There are two approaches for forwarding the frames of the Ethernet at present: Layer 2 Ethernet bridge and Layer 3 IP route. The Layer 2 Ethernet bridge refers to a method for searching the Destination Media Access Control (MAC) address forwarding table by using the MAC address to obtain the exit information and forwarding the data packets according to the exit information. The Layer 3 IP route is a method for searching the routing table by using the destination IP to obtain the exit information and forwarding the data packets according to the exit information. The MAC address forwarding table is obtained through the self-learning of source MAC (SMAC) address or statically configured by software.

At present, as defined in the Ethernet bridge forwarding standard, one Virtual Switching Instance (VSI) corresponds to one Virtual Local Access Network (VLAN) in one access domain. The Layer 2 Ethernet bridge forwarding is forwarding the frames within one VLAN, and if the frames need to be forwarded between different VLANs, the forwarding must be implemented through the Layer 3 IP routing.

FIG. 1 is a flow chart illustrating the bridge forwarding within one VLAN in the prior art. As shown in FIG. 1, the MAC address forwarding table is searched by using the destination MAC address and the VLAN Identifier (ID), the exit information is obtained, and the frames are forwarded according to the exit information. The main procedure of bridge forwarding includes the following steps:

Step 101: Receiving the frame from the input port, and obtaining the input VLAN ID of the frame.

Step 102: The self-learning of SMAC address is implemented, i.e., recording the input port corresponding to the SMAC address in the MAC address forwarding table corresponding to the VLAN ID.

Step 103: Searching the MAC address forwarding table corresponding to the VLAN ID by using the destination MAC (DMAC) address obtained from the frame.

Step 104: If the searching result in the step 103 is the unicast forwarding, performing the step 105; if the searching result in the step 103 is the multicast forwarding, performing the step 106; if the searching result is not hit, performing the step 108.

Step 105: Searching the MAC address forwarding table to obtain the output port, and then proceeding to the step 110.

Step 106: Searching the MAC address forwarding table to obtain the Multicast ID (MID).

Step 107: Searching the Multicast table by using the MID to obtain a set of the output port, and then proceeding to the step 110.

Step 108: Determining to forward the frame with the broadcast mode.

Step 109: Obtaining all the output ports corresponding to the VLAN in which the input ports locates, and proceeding to the step 110.

Step 110: Determining whether the output port is the same as the input port, if so, proceeding to the step 111; otherwise, proceeding to the step 112.

Step 111: Abandoning the frames to prevent forwarding loops.

Step 112: Forwarding the frame to the output port.

The above-mentioned input port and output port correspond to one VSI, and the relationship between the VLAN and the VSI is one-to-one relationship.

Since in one access domain, the relationship between the VLAN and the VSI is one-to-one relationship, and the multiple-to-one relationship between multiple VLANs with one VSI is not supported, the Ethernet frames can only be forwarded within one VLAN by means of Layer 2 Ethernet bridge forwarding. If the frames need to be forwarded across VLANs, the Layer 3 IP routing must be adopted. In addition, the Ethernet frames can only be broadcasted to one VLAN by means of bridge forwarding, and broadcasting to multiple VLANs by means of bridge forwarding is not supported.

SUMMARY OF THE INVENTION

The embodiments of present invention provide a bridge forwarding method and a bridge forwarding apparatus to realize cross-VLAN bridge forwarding of frames.

A bridge forwarding method includes:

obtaining an input virtual local area network (VLAN) identifier (ID) and a destination media access control (MAC) address of a frame upon receiving the frame from an input port;

determining an output port and an output VLAN ID according to the input port, the input VLAN ID and the destination MAC address of the frame, and forwarding the frame according to the output port and the output VLAN ID.

According to a preferable embodiment, the method includes:

establishing relationship between one or more combinations of input port and input VLAN ID with one Virtual Switching Instance (VSI);

obtaining an input VLAN ID and a destination MAC address of a frame upon receiving the frame from an input port;

determining the VSI corresponding to the combination of the input port and the input VLAN ID;

obtaining the output port and the output VLAN ID corresponding to the destination MAC address through searching a MAC address forwarding table corresponding to the VSI.

According to another preferable embodiment of the present invention, the method includes:

establishing relationship between one or more combinations of input port, inner-layer VLAN ID and outer-layer VLAN ID with one VSI;

obtaining the input inner-layer VLAN ID and the input outer-layer VLAN ID of the frame;

determining the VSI corresponding to the combination of the input port, input inner-layer VLAN ID and input outer-layer VLAN ID;

obtain the output port, output inner-layer VLAN ID and output outer-layer VLAN ID corresponding to the destination MAC address through searching the MAC address forwarding table corresponding to the VSI.

A Bridge forwarding apparatus includes:

at least one input port, for receiving a frame from more than one VLAN;

a forwarding unit, for obtaining an input VLAN ID and a destination MAC address of the frame received from the input port, determining an output port and an output VLAN ID according to the input port, the input VLAN ID and the destination MAC address of the frame, and outputting the frame;

at least one output port, for transmitting the frame to more than one VLAN.

wherein, the forwarding unit includes:

a storing module, for storing relationship between combinations of input port and input VLAN identifier and VSIs, as well as MAC address forwarding tables corresponding to the VSIs, wherein at least one combination of input port and input VLAN ID corresponds to one VSI;

an input analyzing module, for obtaining the input VLAN ID and the destination MAC address of the frame, and outputting the input VLAN ID and the destination MAC address;

a first forwarding module, for determining the VSI corresponding to the combination of the input port and the input VLAN ID according to the relationship between the combination of the input port and the input VLAN ID and the VSI, and obtaining the output port and the output VLAN ID through searching the MAC address forwarding table corresponding to the VSI;

a second forwarding module, for forwarding the massage according to the output port and the output VLAN ID obtained by the first forwarding module.

As can be seen from the above-mentioned technical scheme, the cross-VLAN bridge forwarding of frames is realized by establishing the relationship between the {Port, VLAN} and the VSI and implementing bridge forwarding of frames among different {Port, VLAN}s, and the multiple-to-one relationship between multiple VLANs with one VSI, including one-to-one correspondent relationship is realized. The broadcast frames can also be copied for all the {Port, VLAN} combinations corresponding to the VSI, and the bridge broadcasting to multiple VLANs is supported.

Further, during the process of frame forwarding, whether the input/output port is the same as the input/output VLAN ID is determined, so source port filtering can be implemented effectively to prevent forwarding loops. In addition, bridge forwarding among multi-layer VLAN IDs is supported by the present invention.

DETAILED DESCRIPTION OF THE INVENTION

The present invention will be further described in detail hereinafter with reference to the accompanying drawings to make the technical solution and the advantages of the present invention clearer.

The embodiments of the present invention extend the existing bridge forwarding method within one VLAN to realize the cross-VLAN bridge forwarding of frames. In the solution of the present invention, one VSI corresponds to a number of doublets {port, VLAN ID}, i.e., one VSI binds a number of doublets. Each doublet {port, VLAN ID} is regarded as a virtual port, so the bridge forwarding of frames is accomplished among the virtual ports.

In all the doublets corresponding to the same VSI, the relationship may be one port corresponding to one or more VLANs, or multiple ports corresponding to one or more VLANs. The VLAN may be one or more VLANs from the same Ethernet port, one or more VLANs from different ports of the same Ethernet access network, or one or more VLANs from different ports of multiple Ethernet access networks.

Embodiment 1

Figure 1:
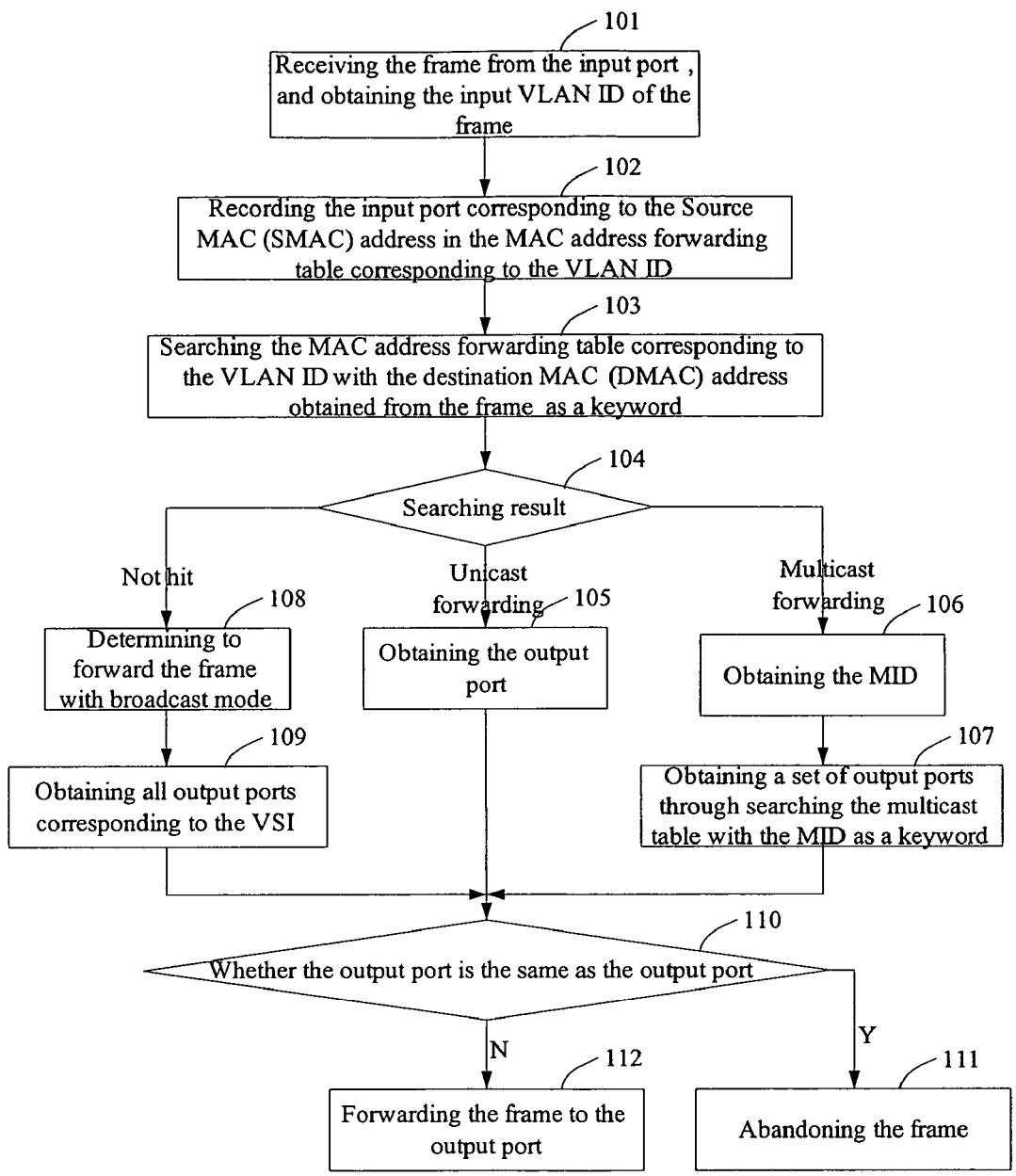
FIG. 1 is a flow chart illustrating the bridge forwarding of frames in the prior art.
Figure 2:
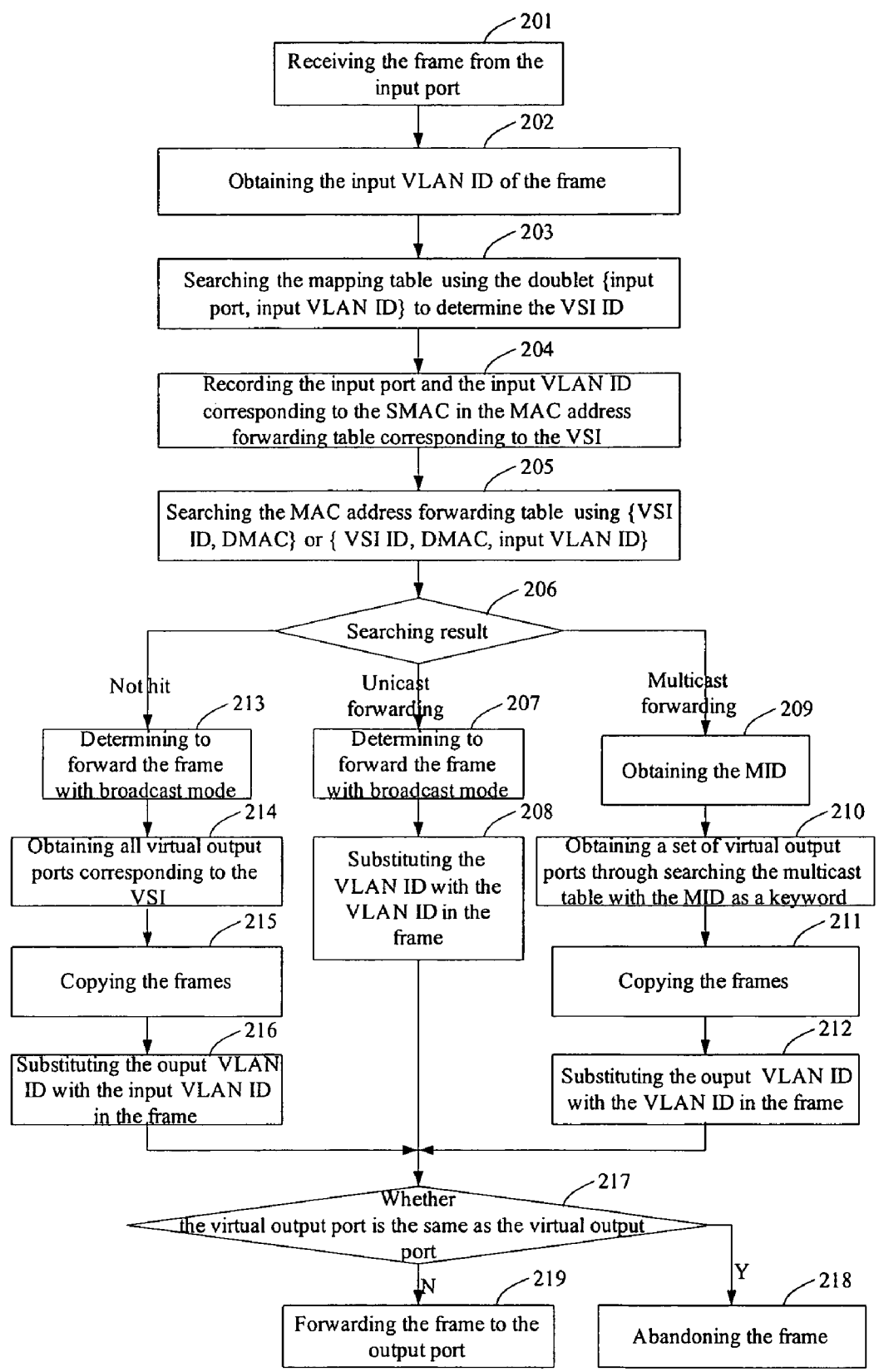
FIG. 2 is a flow chart illustrating the cross-VLAN bridge forwarding according to an embodiment of the present invention.

FIG. 2 is a flow chart illustrating the cross-VLAN bridge forwarding. As shown in FIG. 2, in this embodiment, the cross-VLAN bridge forwarding method mainly includes the steps of:

Step 201: Receiving the frame from the input port.

Step 202: Obtaining the input VLAN ID of the frame. Specifically, deciding whether the VLAN ID is carried in the frame, if so, obtaining the VLAN ID of the frame; otherwise, obtaining the default VLAN ID relevant to the input port, and adding the VLAN ID into the frame.

Step 203: Searching the mapping table by using the doublet {input port, input VLAN ID} to determine the corresponding VSI. Here, the VSI is represented by VSI ID, and the searching result is the corresponding VSI ID. For sake of simplifying the description, one doublet {input port, input VLAN ID} is defined as one input virtual port.

The mapping table is established to prescribe the relationship between a set of the multiple virtual ports and one VSI, and the format of the items in the mapping table is {port, VLAN ID, VSI ID}, and the keyword for searching the mapping table is {port, VLAN ID}, the searching result is the VSI ID corresponding to the virtual port.

Step 204: The self-learning of SMAC address is implemented, i.e., recording the input port and the input VLAN ID corresponding to the SMAC address in the MAC address forwarding table corresponding to the VSI.

Step 205: Obtaining the DMAC from the frame, and searching the MAC address forwarding table corresponding to the VSI with the DMAC address as the keyword, or obtaining the DMAC address and the input VLAN ID from the frame, and searching the MAC address forwarding table corresponding to the VSI with the DMAC address and the VLAN ID as the keywords.

For the instance of the MAC address forwarding table being not differentiated according to the VSI, i.e., only one MAC address forwarding table is configured, the unified MAC address table is searched with the VSI ID and the DMAC address as the keywords, or the unified MAC address table is searched with the VSI ID, the DMAC address and the input VLAN ID as the keywords.

Step 206: If the searching result in the Step 205 is the unicast forwarding, proceeding the step 207; if the searching result is the multicast forwarding, proceeding the step 209; if the searching result is not hit, proceeding the step 213.

One flag bit in the item of the MAC address forwarding table is used for representing unicast forwarding mode or multicast forwarding mode, so whether the frame is forwarded with unicast or multicast mode can be determined according to the value of the flag bit.

Step 207: Searching the MAC address forwarding table to obtain {output port, output VLAN ID}, for sake of simplifying the description, defining the {output port, output VLAN ID} as the output virtual port.

Step 208: Substituting the output VLAN ID for the input VLAN ID in the frame, and proceeding to the step 217;

Step 209: Searching the MAC address forwarding table to obtain the output MID.

Step 210: searching the multicast table with the MID as a keyword to obtain a set of the output virtual port, i.e., {output port i, output VLAN IDi}, wherein, i=1 . . . n, the i is the serial number of the output virtual ports, and the n is the total number of the obtained output virtual ports after searching the multicast table;

The multicast table is established through the multicast protocol or any other approach in the switch, and the keyword for searching the multicast table is the MID. The searching result is a set of all the {output port, output VLAN ID} corresponding to the MID.

Step 211: Copying the received frame to n copies, wherein the n is a positive integer.

Step 212: Substituting the output VLAN IDi for the input VLAN ID in the frame, proceeding to the step 217.

Step 213: If there is nothing can be found from the MAC address forwarding table, determining to forward the frame with the broadcast mode.

Step 214: Obtaining all the output virtual ports corresponding to the VSI, i.e., {output port j, output VLAN IDj}, wherein, j=1 . . . m, the j is the serial number of the output virtual ports, and the m is the total number of the output virtual ports in the broadcast mode.

All the output virtual ports corresponding to the VSI is obtained by searching the broadcast table, and the broadcast table is also established through the multicast protocol or any other approach in the switch. The keyword for searching the multicast table is the VSI ID, and the searching result is a set of all the {output port, output VLAN ID} corresponding to the VSI ID.

Step 215: Copying the received frame to m copies.

Step 216: Substituting the output VLAN IDj for the input VLAN ID in the frame, proceeding to the Step 217.

Step 217: Determining whether the output virtual port is completely the same as the input virtual port, i.e., determining whether the output port is the same as the input port and the output VLAN ID is the same as the input VLAN ID, if the output port is the same as the input port and the output VLAN ID is the same as the input VLAN ID, proceeding to the Step 218; if the output port is the same as the input port while the output VLAN ID is not the same as the input VLAN ID, or if the output port is not the same as the input port and the output VLAN ID is the same as the input VLAN ID, proceeding to the Step 219.

Step 218: Abandoning the frame.

Step 219: Forwarding the frame to the output port.

The formal standard of the Virtual Bridge LAN, IEEE 802.1 Q, prescribes that multiple logical subnet VLANs can be divided in one physical bridge apparatus, and each VLAN corresponds to one logical forwarding table. In practical terms, one MAC address forwarding table is generally divided into multiple logical forwarding tables according to the VLAN ID. Four bytes are added in the Ethernet frame structure, and these four bytes are called generally as the Virtual Local Access Network Tag (VLAN Tag). In these four bytes, 12 bits are used for expressing the VLAN ID.

The IEEE 802.1ad standard adds Q-in-Q and VLAN Translation based on the IEEE 802.1 Q. The Q-in-Q refers to adding one more layer of VLAN Tag for the frame of IEEE 802.1Q in an Ethernet switch, the previous Tag of the frame is known as CE-VLAN, and the new Tag added by the operators on the PE is called P-VLAN. Employing two layers of the VLAN makes the CE-VLAN used by the users and the P-VLAN used by the operators independent to each other. The VLAN Translation refers to translating one VLAN ID to another on a port of a bridge.

In the above-mentioned Step 208, Step 212 and Step 216, substituting the output VLAN ID for the VLAN ID in the frame. If the Q-in-Q service defined by the IEEE 802.1 ad protocol is adopted, the previous VLAN ID is reserved and a layer of new output VLAN ID is added, i.e., more 4 bytes are added, and 12 bits of the 4 bytes are used for expressing the output VLAN ID.

In this embodiment, the process of the source port restraint can be performed after obtaining the output virtual port and before substituting the VLAN ID. For example, in the case of the unicast forwarding, after obtaining the virtual port in the Step 207, determining whether the output virtual port is completely the same as the input virtual port, if they are completely same, abandoning the frame and ending the current flow; if they are not completely same, substituting the output VLAN ID for the VLAN ID in the frame, as said in the Step 208.

As said in the Step 204, the MAC address forwarding table is established through self-learning, one MAC address forwarding table can be established in the switch, and the contents learned in connection with the multiple VSIs are recorded in the MAC address forwarding table. In the MAC address forwarding table, different VSI can be differentiated by VSI ID. Alternatively, multiple MAC address forwarding tables can be established, and each MAC address forwarding table corresponds to one VSI. When the SMAC address self-learning is implemented, the input port and the input VLAN ID of the frame are recorded in the MAC address forwarding table corresponding to the VSI. The format of the items in the MAC address forwarding table is {VSI ID, MAC address, Port, VLAN ID}, the keyword for searching the table is {VSI ID, DMAC} or {VSI ID, DMAC, input VLAN ID}, and the searching result is corresponding {output port, output VLAN ID}.

In the MAC address forwarding table, the VLAN ID can be recorded or searched indirectly through the format of the Tag Value or Tag Index. Here, the relationship between the VLAN ID and the Tag Value or the Tag Index should be established in advance. For instance, transforming the learned VLAN ID to a Tag Value or a Tag Index according to the pre-established relationship, and records the Tag Value or the Tag Index in the corresponding item in the MAC address forwarding table. When the output virtual port is found after searching the MAC address forwarding table with a keyword, and the output VLAN ID found is expressed by the Tag Value or the Tag Index, the output VALN ID can be obtained according to the pre-established relationship.

Embodiment 2

The Embodiment 1 describes the bridge forwarding of frames with only one input VLAN ID. In practical terms, however, there is more than one layer of input VLAN ID and output VLAN ID, i.e., there are two layers or more than two layers of input VLAN ID and output VLAN ID. For example, in the applications according to IEEE 802.1 ad standard, two layers of VLAN IDs are carried in the frame. In this kind of application environment, there are two layers of input VLAN ID, so it possibly needs two layers of output VLAN ID. In this embodiment, a number of {input port, input outer-layer VLAN, input inner-layer VLAN} correspond to one VSI, i.e., a number of {input port, input outer-layer VLAN, input inner-layer VLAN} is bound with one VSI.

The main procedure of bridge forwarding of frames with two layers of input VLAN ID and output VLAN ID is described in detail with reference to FIG. 3.

Step 301: Receiving the frame from the input port.

Step 302: Determining whether the VLAN ID is carried in the frame, if so, obtaining the VLAN ID including the outer-layer VLAN ID and the inner-layer VLAN ID in the frame; otherwise, obtaining the default outer-layer VLAN ID and the default inner-layer VLAN ID relevant to the input port, and adds the default outer-layer VLAN ID and the default inner-layer VLAN ID in the frame.

Step 303: Searching the mapping table by using the input virtual port, i.e., using a triplet {input port, input VLAN ID} to determine the corresponding VSI ID.

Step 304: The self-learning of SMAC address is implemented. That is, recording the input port, input outer-layer VLAN ID and the input inner-layer VLAN ID corresponding to the SMAC address in the MAC address forwarding table corresponding to the VSI.

Step 305: Obtaining the DMAC address from the frame, and searching the MAC address forwarding table corresponding to the VSI with the DMAC address as the keyword, or searching the MAC address forwarding table corresponding to the VSI with the DMAC address, the input inner-layer VLAN and the input outer-layer VLAN ID as the keywords.

For the instance of the MAC address forwarding table being not differentiated according to the VSI, i.e., only one MAC address forwarding table is configured, the unified MAC address forwarding table is searched with the VSI ID and the DMAC address as the keywords, or the unified MAC address forwarding table is searched with the VSI ID, the DMAC address, and the input inner-layer VLAN and the input outer-layer VLAN ID as the keywords.

Step 306: If the searching result in the Step 305 is the unicast forwarding, proceeding to the Step 307; if the searching result is the multicast forwarding, proceeding to the Step 309; if the searching result is not hit, proceeding to the Step 313.

Step 307: Searching the MAC address forwarding table to obtain the output triplet {output port, output outer-layer VLAN ID, output inner-layer VLAN ID}.

Step 308: Substituting the output out-layer VLAN ID for the input outer-layer VLAN ID in the frame, proceeding to the Step 317.

Step 309: Searching the MAC address forwarding table to obtain the output MID.

Step 310: Searching the multicast table using the MID to obtain a set of the output virtual ports, i.e., {output port i, output outer-layer VLAN IDi, output inner-layer VLAN IDi}, wherein, i=1 . . . n, the i is the serial number of the output virtual ports, and the n is the total number of the output virtual ports found by searching the multicast table.

Step 311: Copying the received frame to n copies.

Step 312: Substituting the output outer-layer VLAN IDi for the input outer-layer VLAN ID in the frame, substituting the output inner-layer VLAN IDi for the input inner-layer VLAN ID in the frame, and then proceeding to the Step 317.

Step 313: If there is nothing can be found after searching the MAC address forwarding table, determining that the frame is forwarded with the broadcast mode.

Step 314: Obtaining all the output virtual ports corresponding to the VSI, i.e., {output port j, output outer-layer VLAN IDj, output inner-layer VLAN IDj}, wherein, j=1 . . . m, the j is the serial number of the output virtual ports, and the m is the total number of the broadcast output virtual ports.

Step 315: Copying the received frame to m copies.

Step 316: Substituting the output outer-layer VLAN IDj for the input outer-layer VLAN ID in the frame, substituting the output inner-layer VLAN IDj for the input inner-layer VLAN ID in the frame, and then proceeding to the step 317.

Step 317: Determining whether the output virtual port is completely the same as the input virtual port, i.e., determining whether the output port, the output outer-layer VLAN ID and the output inner-layer VLAN ID are the same as the input port, the input outer-layer VLAN ID and the input inner-layer VLAN ID respectively; if the output port, the output outer-layer VLAN ID and the output inner-layer VLAN ID are the same as the input port, the input outer-layer VLAN ID and the input inner-layer VLAN ID respectively, proceeding to the Step 318; otherwise, proceeding to the Step 319.

Step 318: Abandoning the frame.

Step 319: Forwarding the frame to the output port.

In summary, the present invention combines multiple {port, VLAN} s in a set, and binds the set to one VSI, then the Ethernet frame is forwarded among the {Port, VLAN}s corresponding to the same VSI, thereby realizing the cross-VLAN bridge forwarding of frames. The main idea of the bridge forwarding is: obtaining the VLAN ID in the frame upon receiving the frame from the input port; determining the VSI corresponding to the {input port, input VLAN ID}; searching the {output port, output VLAN ID} corresponding to the {VSI, DMAC} in the MAC address forwarding table, and forwarding the frame according to the {output port, output VLAN ID} found after searching the table. Here, the VLAN ID can be one VLAN ID or a combination of two or multiple VALN IDs. For instance, a number of {port, outer-layer VLAN, inner-layer VLAN} and {port, VLAN} are bound to one VSI.

One layer of VLAN ID or two or more layers of VLAN ID can be obtained from the inputted frame.

If there is one layer of VLAN ID, the VSI corresponding to the {input port, input VLAN ID} is searched; if there are two layers of VLAN ID, the VSI corresponding to the {input port, input outer-layer VLAN ID, input inner-layer VLAN ID} is searched.

During the SMAC address self-learning process, the VLAN IDs obtained from the frame are recorded in the MAC address forwarding table in turn. When the MAC address forwarding table is searched during the forwarding process, the obtained output VLAN ID can be one layer, two layers or more layers, which is relevant to the VLAN ID recorded during the SMAC address self-learning process.

When the frame is forwarded, the output VLAN ID of the corresponding layer is substituted for the input VLAN ID of the corresponding layer, i.e., the output outer-layer VLAN ID is substituted for the input outer-layer VLAN ID, and the output inner-layer VLAN ID is substituted for the input inner-layer VLAN ID; or the frame is forwarded to the output port after the output VLAN ID is added.

When the source port filtering is performed, the input port and the output port are compared, and the input VLAN ID and the output VLAN ID of the corresponding port are compared, if the comparison results are completely same, the frame is abandoned; otherwise, the frame is forwarded.

Figure 4:
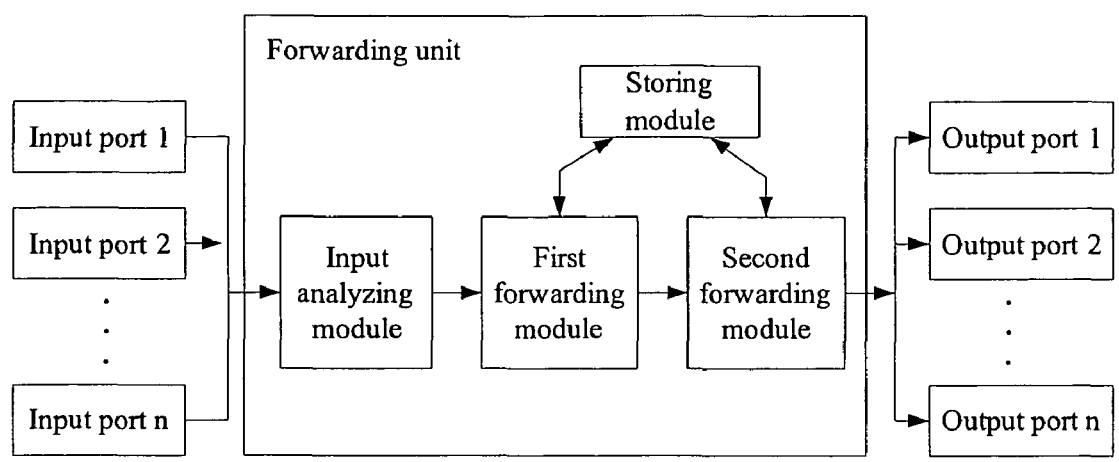
FIG. 4 is a schematic diagram illustrating the bridge forwarding apparatus according to an embodiment of the present invention.

The present invention also provides a bridge forwarding apparatus, as shown in FIG. 4, the apparatus includes:

at least one input port for receiving the frame from more than one VLAN;

a forwarding unit for obtaining the input VLAN ID and the DMAC address received by the input port, determining the output port and the output VLAN ID according to the input port, input VLAN ID and the DMAC address, and then outputting the frame; and at least one output port for transmitting the frame to more then one VLAN;

The forwarding unit includes:

a storage module for saving the relationship between the combinations of the ports and the VLAN IDs with the VSIs, as well as all the MAC address forwarding tables corresponding to the VSI, wherein, at least one combination of the port and the VLAN ID corresponds to one VSI;

an input analyzing module for obtaining the input VLAN ID and the DMAC address of the frame, and outputting the input VLAN ID and the DMAC address;

a first forwarding module for determining the VSI corresponding to the combination of the input port and the input VLAN ID according to the relationship between the combination of the port and the VLAN ID with the VSI, then searching the MAC address forwarding table corresponding to the VSI to obtain the output port and the VLAN ID;

a second forwarding module for transmitting the massage to the output port according to the searching result of the first forwarding module.

If the searching result of the first forwarding module is only the output port and the output VLAN ID, the second forwarding module is instructed to add the output VLAN ID into the frame or substitute the output port for the input port in the frame before forwarding the frame to the output port.

The storage unit also saves the relationship between the multicast ID (MID) with the output port as well as the output VLAN ID.

If the searching result of the first forwarding module is the output MID, the first forwarding module searches the multicast table using the MID to obtain a set of the output ports and the output VLAN IDs, and this set includes N combinations of the output ports and the output VLAN IDs, wherein, the N is a positive integer.

In this case, the first forwarding module instructs the second forwarding module to copy the frame to N copies, and adds the corresponding output VLAN in the N frames respectively or substitutes the corresponding output VLAN IDs for the input VLAN IDs in the N copies of frames respectively before forwarding the N frames to the corresponding output ports.

If the searching result of the first forwarding module is no corresponding output port and the output VLAN ID found in the MAC address forwarding table, the M combinations of the output port and the output VLAN ID corresponding to the VSI are regarded as the obtained output port and VLAN ID, wherein the M is a positive integer.

In this case, the first forwarding module instructs the second forwarding module to copy the frame to M copies, and adds the corresponding output VLAN in the M frames respectively or substitutes the corresponding output VLAN IDs for the input VLAN IDs in the M copies of frames respectively before forwarding the M frames to the corresponding output ports.

Before forwarding the frame to the output port, if the second forwarding module detects that the output port is the same as the input port and the output VLAN ID is the same as the input VLAN ID, abandons the frame.

The first module implements the SMAC address self-leaning, and records the input port and the input VLAN ID corresponding to the SMAC address in the MAC address forwarding table corresponding to the VSI.

Figure 3:
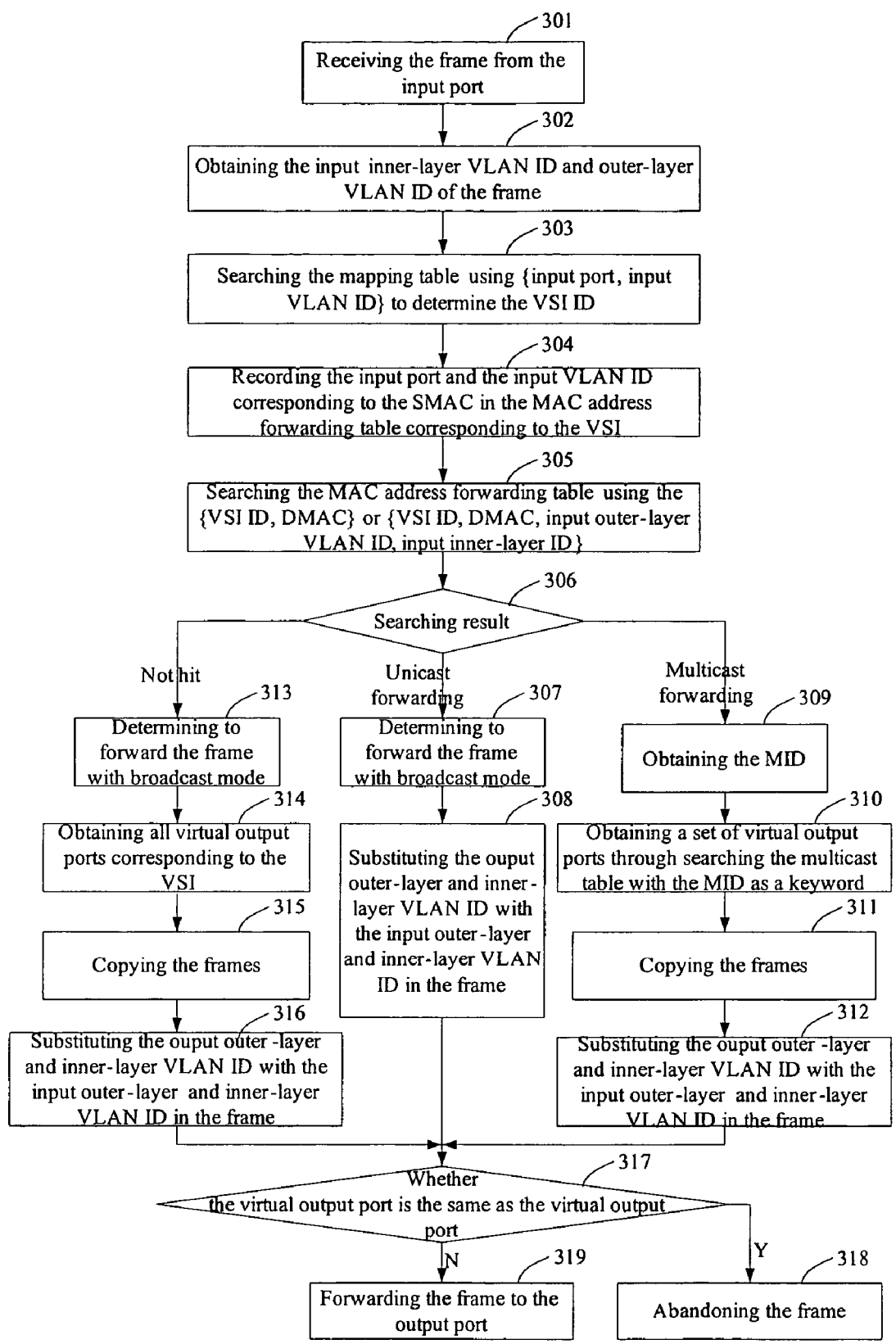
FIG. 3 is a flow chart illustrating the cross-VLAN bridge forwarding according to another embodiment of the present invention.

The input VLAN ID includes the input inner-layer VLAN ID and the input outer-layer VLAN ID; the output VLAN ID includes the output inner-layer VLAN ID and the output outer-layer VLAN ID Similar to the flow shown in FIG. 3, if the VLAN ID is a two-layer VLAN ID, when the second forwarding module forwards the frame, substitutes the output inner-layer VLAN ID and the output outer-layer VLAN ID for the input inner-layer VLAN ID and the input outer-layer VLAN ID in the frame respectively. The second forwarding module detects whether the output VLAN ID is the same as the input VLAN ID, and when the output inner-layer VLAN ID and the output outer-layer VLAN ID are respectively the same as the input inner-layer VLAN ID and the input outer-layer VLAN ID, it can be determined that the output VLAN ID is the same as the input VLAN ID.

The above-mentioned partitioning of the first forwarding module and the second forwarding module is only for sake of simplifying the description. The instances hereinafter are also within the scope of the present invention: combining the first forwarding module and the second forwarding module to one module; splitting the first forwarding module or the second forwarding module into more modules; transferring a part of the functions of the first forwarding module to the second forwarding module or/and transferring a part of the functions of the second forwarding module to the first forwarding module.

The foregoing is only the preferred embodiments of the present invention and is not intended to limit the scope of the present invention. Any modification, equivalent substitution, or improvement made without departing from the spirit and principle of the present invention should be covered by the scope set forth in the appended claims.

The invention claimed is:

1. A forwarding method, comprising:
receiving, via an input port, a frame associated with a first virtual local area network (VLAN);
obtaining an input VLAN identifier (ID) representing the first VLAN and a destination media access control (MAC) address of the received frame;
determining a Virtual Switching Instance (VSI) corresponding to the combination of the input port and the input VLAN ID;
obtaining an output port and an output VLAN ID, wherein the output VLAN ID represents a second VLAN and wherein the output port and the output VLAN ID relate to the destination MAC address and the VSI; and
communicating the received frame and the output VLAN ID to the obtained output port, wherein the output VLAN ID is different from the input VLAN ID.

2. The method of claim 1, wherein obtaining the input VLAN ID of the received frame further comprises:
detecting if the received frame includes the VLAN ID and obtaining the detected VLAN ID; and
obtaining a default VLAN ID if the received frame does not include the VLAN ID and appending the default VLAN ID to the received frame, wherein the default VLAN ID corresponds to the input port.

3. The method of claim 1, wherein obtaining the input VLAN identifier (ID) representing the first VLAN and the destination media access control (MAC) address further comprises:
accessing a MAC address forwarding table including the destination MAC address, wherein the MAC address forwarding table is configured to record a source MAC address, the input port and the input VLAN ID in the MAC address forwarding table corresponding to the VSI.

4. The method of claim 1, wherein communicating the received frame and the output VLAN ID to the obtained output port further comprises:
adding the output VLAN ID to the received frame, or substituting the output VLAN ID for the input VLAN ID contained by the frame.

5. The method of claim 1, wherein obtaining the output port and the output VLAN ID corresponding to the destination MAC address and the VSI comprises:
 searching a MAC address forwarding table;
 searching, if the result of searching the MAC address forwarding table is a multicast ID (MID), a multicast table with the MID as a keyword to obtain a set of N combinations of the output port and the output VLAN ID, wherein N is a positive integer;
 wherein communicating the received frame and the output VLAN ID further comprises:
 generating N copies of the received frame;
 adding the corresponding output VLAN ID to each of the N copies of the received frame, respectively, or substituting the corresponding output VLAN ID for each input VLAN ID contained by the N copies of frame, respectively; and
 communicating the N copies of frame to the corresponding output ports.

6. The method of claim 1, wherein obtaining the output port and the output VLAN ID corresponding to the destination MAC address and the VSI comprises
 searching a MAC address forwarding table;
 designating, if no corresponding output port and the output VLAN ID is identified in the MAC address forwarding table, M combinations of the output ports and the output VLAN IDs corresponding to the VSI as the found output port and the output VLAN ID, wherein M is a positive integer;
 wherein communicating the received frame and the output VLAN ID to the obtained output port comprises:
 generating M copies of the received frame;
 adding the corresponding output VLAN ID to each of the M copies of frame, respectively, or substituting the corresponding output VLAN ID for each input VLAN ID in the M copies of frame, respectively; and
 communicating each of the M copies of frame to the corresponding output port.

7. The method of claim 1, further comprising:
 abandoning the received frame prior to communicating, if it is determined that the output port is the same as the input port and the output VLAN ID is the same as the input VLAN ID.

8. The method of claim 1, further comprising:
 establishing a relationship between the input VLAN ID obtained from the received frame with a Tag value or a Tag index;
 storing the Tag value or the Tag index corresponding to the input VLAN ID in a MAC address forwarding table, wherein the Tag value or Tag index corresponds to the VSI;
 wherein obtaining the output VLAN ID further comprises:
 searching the MAC address forwarding table to determine the Tag value or the Tag index; and
 obtaining the output VLAN ID according to the determined Tag Value or the Tag index.

9. The method of claim 1, further comprising:
 establishing a relationship between one or more combinations of the input port, an input inner-layer VLAN ID and an input outer-layer VLAN ID with the VSI;
 wherein obtaining the input VLAN ID of the received frame further comprises:
 obtaining the input inner-layer VLAN ID and the input outer-layer VLAN ID of the received frame;
 wherein obtaining the output port and the output VLAN ID representing the second VLAN and corresponding to the destination MAC address and the VSI further comprises:
 determining the VSI corresponding to the combination of the input port, the input inner-layer VLAN ID and input outer-layer VLAN ID; and
 obtaining the output port, an output inner-layer VLAN ID and an output outer-layer VLAN ID corresponding to the destination MAC address by searching a MAC address forwarding table corresponding to the VSI.

10. The method of claim 9, wherein the searching the MAC address forwarding table further comprises:
 storing a source MAC address, the input port, the input inner-layer VLAN ID and the input outer-layer VLAN ID in the MAC address forwarding table corresponding to the VSI.

11. The method of claim 9, wherein searching the MAC address forwarding table corresponding to the VSI further comprises:
 searching the MAC address forwarding table corresponding to the VSI with the destination MAC address as a keyword; or
 searching the MAC address forwarding table corresponding to the VSI with the destination MAC address, the input inner-layer VLAN ID and the input outer-layer VLAN ID as keywords.

12. The method of claim 9, wherein obtaining the output port and the output VLAN ID by searching the MAC address forwarding table further comprises:
 obtaining only the output port, output inner-layer VLAN ID and output outer-layer VLAN ID; and
 wherein communicating the received frame and the output VLAN ID further comprises:
 adding the output inner-layer VLAN ID and the output outer-layer ID to the received frame, or substituting the output inner-layer VLAN ID and the output outer-layer ID for the input inner-layer VLAN ID and the input outer-layer ID, respectively.

13. The method of claim 9, wherein obtaining the output port and the output VLAN ID by searching the MAC address forwarding table further comprises:
 searching, if the result of searching the MAC address forwarding table is a MID, a multicast table with the MID as a keyword to obtain a set of N combinations of the output port, the output inner-layer VLAN ID and the output outer-layer VLAN ID, wherein N is a positive integer;
 wherein communicating the received frame comprises:
 generating N copies of the received frame;
 adding the corresponding output inner-layer VLAN ID and output outer-layer VLAN ID to each of the N copies of frame, respectively, or substituting the corresponding output inner-layer VLAN ID and output outer-layer VLAN ID for the input inner-layer VLAN ID and input outer-layer VLAN ID in each of the N copies of frame, respectively; and
 communicating the N copies of frame to the corresponding output ports.

14. The method of claim 9, wherein said obtaining the output port and the output VLAN ID through searching the MAC address forwarding table comprises:
 designating, if finding no corresponding output port and the output VLAN ID in the MAC address forwarding table are identified, M combinations of the output port, the output inner-layer VLAN ID and the output outer-layer VLAN ID corresponding to the VSI as a found output port, an output inner-layer VLAN ID and an output outer-layer VLAN ID;

wherein communicating the received frame comprises:
generating M copies of the received frame;
adding the corresponding output inner-layer VLAN ID and output outer-layer VLAN ID to each of the M copies of frame respectively, or substituting the corresponding output inner-layer VLAN ID and output outer-layer VLAN ID for the input inner-layer VLAN ID and input outer-layer VLAN ID in each of the M copies of frame respectively; and
communicating each of the M copies of received frame to the corresponding output ports.

15. The method of claim 9, further comprising:
abandoning the received frame prior to communicating if it is determined that the output port, the output inner-layer VLAN ID and the output outer-layer VLAN ID are the same as the input port, the input outer-layer VLAN ID and the input outer-layer VLAN ID, respectively.

16. The method of claim 1, wherein the first VLAN includes one or more VLANs on a same network port, or one or more VLANs on different ports of a same network, or one or more VLANs on different ports of more than one network.

17. A bridge forwarding apparatus comprising:
an input port configured to receive a frame from at least two virtual local area networks (VLAN);
a forwarding unit that executes:
in a storing module storing a plurality of relationships between combinations of the input port and input VLAN identifier and Virtual Switching Instances (VSI); and storing MAC address forwarding tables corresponding to the VSI, wherein at least one combination of input port and input VLAN ID corresponds to one VSI;
in an input analyzing module obtaining the input VLAN ID and the destination MAC address of the received frame, and outputting the input VLAN ID and the destination MAC address;
in a first forwarding module determining the VSI corresponding to the combination of the input port and the input VLAN ID according to the relationship between the combination of the input port and the input VLAN ID and the VSI, and obtaining an output port and an output VLAN ID by searching the MAC address forwarding table corresponding to the VSI; and
in a second forwarding module forwarding the frame according to the output port and the output VLAN ID obtained by the first forwarding module; and
an output port configured to communicate the received frame to more than one VLAN according to the output VLAN ID.

18. The apparatus of claim 17, wherein the first forwarding module is further configured to:
instruct the second forwarding module to forward the frame after adding the output VLAN ID in the frame or substituting the output VLAN ID for the input VLAN ID in the frame.

19. The apparatus of claim 17, wherein the storing module is further configured to:
store at least one relationship between multicast IDs (MID) and combinations of output port and output VLAN ID;
wherein the first forwarding module is further configured to:
search a multicast table with the MID as a keyword to obtain a set of N combinations of the output port and the output VLAN ID, wherein the N is a positive integer; and
instruct the second forwarding module to generate N copies of the received frame;
add the corresponding output VLAN ID in the N copies of the received frames respectively, or substitute the corresponding output VLAN ID for the input VLAN ID in the N copies of the received frame respectively, and
forward the N copies of the received frames to the corresponding output ports.

20. The apparatus of claim 17, wherein the first forwarding module is further configured to:
designate, if no corresponding output port and the output VLAN ID is obtained in the MAC address forwarding table, M combinations of the output ports and the output VLAN IDs corresponding to the VSI as the obtained output port and VLAN ID, wherein M is a positive integer;
instruct the second forwarding module to generate M copies of the received frame;
add the corresponding output VLAN ID in each of the M copies of the received frame respectively, or substitutes the corresponding output VLAN IDs for the input VLAN IDs in each of the M copies of received frame respectively; and
forward the M frames to the corresponding output ports.

21. The apparatus of claim 17, wherein the second forwarding module is further configured to:
detect, before forwarding the received frame to the output port, whether the output port and the output VLAN ID are the same as the input port and the input VLAN ID respectively; and
abandoning the frame in which the output port and the output VLAN ID are the same as the input port and the input VLAN ID respectively.

22. The apparatus of claim 17, wherein the first forwarding module is further configured to:
store the input port and the input VLAN ID corresponding to the VSI in the MAC address forwarding table.

23. The apparatus of claim 17, wherein the input VLAN ID comprises an input inner-layer VLAN ID and an input outer-layer VLAN ID;
wherein the output VLAN ID comprises an output inner-layer VLAN ID and an output outer-layer VLAN ID.

* * * * *